United States Patent
Thielemans et al.

(10) Patent No.: US 12,425,538 B2
(45) Date of Patent: Sep. 23, 2025

(54) FOCUSED SOUND AND INFOTAINMENT SYSTEM AND METHOD

(71) Applicant: Stereyo BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 146 days.

(21) Appl. No.: 17/865,871

(22) Filed: Jul. 15, 2022

(65) Prior Publication Data
US 2024/0022686 A1    Jan. 18, 2024

(51) Int. Cl.
 *G09F 19/22* (2006.01)
 *G09F 27/00* (2006.01)
 *H04N 7/04* (2006.01)

(52) U.S. Cl.
 CPC .............. *H04N 7/04* (2013.01); *G09F 19/22* (2013.01); *G09F 27/005* (2013.01); *G09F 2027/001* (2013.01)

(58) Field of Classification Search
None
See application file for complete search history.

(56) References Cited

U.S. PATENT DOCUMENTS

| | | | |
|---|---|---|---|
| 5,767,818 A | 6/1998 | Nishida | |
| 6,055,071 A | 4/2000 | Kuwata et al. | |
| 6,483,555 B1 | 11/2002 | Thielemans et al. | |
| 6,717,625 B1 | 4/2004 | Thielemans | |
| 7,015,902 B2 | 3/2006 | Nagai et al. | |
| 7,019,721 B2 | 3/2006 | Thielemans et al. | |
| 7,071,620 B2 | 7/2006 | Devos et al. | |
| 7,071,894 B1 | 7/2006 | Thielemans et al. | |
| 7,079,092 B2 | 7/2006 | Tanghe et al. | |
| 7,102,601 B2 | 9/2006 | Devos et al. | |
| 7,157,838 B2 | 1/2007 | Thielemans et al. | |
| 7,176,861 B2 | 2/2007 | Dedene et al. | |
| 7,205,729 B2 | 4/2007 | Thielemans et al. | |
| 7,227,519 B1 | 6/2007 | Kawase et al. | |
| 7,262,753 B2 | 8/2007 | Tanghe et al. | |
| 7,301,273 B2 | 11/2007 | Dedene et al. | |
| 7,365,720 B2 | 4/2008 | Bouwens et al. | |

(Continued)

FOREIGN PATENT DOCUMENTS

| BE | 20195196 | 3/2019 |
|---|---|---|
| BE | 20195142 | 7/2019 |

(Continued)

OTHER PUBLICATIONS

Belgian Search Report from Belgian Patent Application No. BE202305595, Nov. 21, 2023.

(Continued)

*Primary Examiner* — James K Mooney
(74) *Attorney, Agent, or Firm* — Workman Nydegger

(57) ABSTRACT

A focused sound and infotainment system is provided along a continuous path. A moving staircase, escalator or walkway, is also provided for transporting persons, living things and/or objects, with which said focused sound and infotainment system is provided. A method is also disclosed for providing audio-visual information along a continuous path, particularly intended for and directed to people, living things, and/or objects being on the path and possible moving there along.

30 Claims, 4 Drawing Sheets

(56) References Cited

U.S. PATENT DOCUMENTS

| | | |
|---|---|---|
| 7,443,466 B2 | 10/2008 | Dedene et al. |
| 7,777,691 B1 | 8/2010 | Nimmer et al. |
| D730,309 S | 5/2015 | Hochman et al. |
| 9,069,519 B1 | 6/2015 | Hall |
| D751,998 S | 3/2016 | Hochman et al. |
| 9,380,720 B2 | 6/2016 | Thielemans et al. |
| 9,477,438 B1 | 10/2016 | Hochman et al. |
| D771,844 S | 11/2016 | Hochman et al. |
| 9,524,666 B2 | 12/2016 | Hochman et al. |
| 9,660,403 B2 | 5/2017 | Hochman et al. |
| 10,325,541 B2 | 6/2019 | Hochman et al. |
| 10,333,109 B2 | 6/2019 | Hochman et al. |
| 10,892,297 B2 | 1/2021 | Chae et al. |
| 10,917,679 B2 | 2/2021 | Dunning et al. |
| 11,310,436 B2 | 4/2022 | Hochman et al. |
| 11,328,655 B2 | 5/2022 | Sugiyama et al. |
| 11,445,123 B2 | 9/2022 | Deighton |
| 11,496,726 B2 | 11/2022 | Deighton |
| 11,552,061 B2 | 1/2023 | Chae et al. |
| 11,610,543 B2 | 3/2023 | Thielemans et al. |
| 11,695,907 B2 | 7/2023 | Steudel et al. |
| 11,881,151 B2 | 1/2024 | Thielemans et al. |
| 11,924,560 B2 | 3/2024 | Thielemans et al. |
| 11,948,501 B2 | 4/2024 | Thielemans et al. |
| 11,948,506 B2 | 4/2024 | Thielemans et al. |
| 2002/0163513 A1 | 11/2002 | Tsuji |
| 2003/0095138 A1 | 5/2003 | Kim et al. |
| 2003/0128299 A1 | 7/2003 | Coleman et al. |
| 2003/0133619 A1 | 7/2003 | Wong et al. |
| 2004/0113875 A1 | 6/2004 | Miller et al. |
| 2004/0207315 A1 | 10/2004 | Thielemans et al. |
| 2004/0212582 A1 | 10/2004 | Thielemans et al. |
| 2004/0233125 A1 | 11/2004 | Tanghe et al. |
| 2004/0233148 A1 | 11/2004 | Tanghe et al. |
| 2005/0017922 A1 | 1/2005 | Devos et al. |
| 2005/0052375 A1 | 3/2005 | Devos et al. |
| 2005/0116667 A1 | 6/2005 | Mueller et al. |
| 2005/0122406 A1 | 6/2005 | Voss et al. |
| 2005/0128751 A1 | 6/2005 | Roberge et al. |
| 2005/0133761 A1 | 6/2005 | Thielemans |
| 2005/0134525 A1 | 6/2005 | Tanghe et al. |
| 2005/0134526 A1 | 6/2005 | Willem et al. |
| 2005/0213128 A1 | 9/2005 | Imai et al. |
| 2006/0022914 A1 | 2/2006 | Kimura et al. |
| 2006/0044290 A1* | 3/2006 | Hurwitz ................. G06F 21/84 345/204 |
| 2006/0139238 A1 | 6/2006 | Chiba et al. |
| 2006/0290614 A1 | 12/2006 | Nathan et al. |
| 2007/0081357 A1 | 4/2007 | Kim et al. |
| 2007/0241988 A1 | 10/2007 | Zerphy et al. |
| 2007/0253008 A1 | 11/2007 | Edge et al. |
| 2007/0263394 A1 | 11/2007 | Thielemans et al. |
| 2008/0046217 A1 | 2/2008 | Polonskiy et al. |
| 2008/0079816 A1 | 4/2008 | Yen et al. |
| 2008/0111773 A1 | 5/2008 | Tsuge |
| 2008/0165081 A1 | 7/2008 | Lawther et al. |
| 2008/0285981 A1 | 11/2008 | Diab et al. |
| 2009/0009103 A1 | 1/2009 | McKechnie et al. |
| 2009/0066631 A1 | 3/2009 | Lianza |
| 2009/0102957 A1 | 4/2009 | Phelan |
| 2009/0103200 A1 | 4/2009 | Feklistov et al. |
| 2009/0295706 A1 | 12/2009 | Feng |
| 2010/0001648 A1 | 1/2010 | De Clercq et al. |
| 2010/0103200 A1 | 4/2010 | Langendijk |
| 2010/0243025 A1 | 9/2010 | Bhatia et al. |
| 2010/0289783 A1 | 11/2010 | Leppla |
| 2010/0302284 A1* | 12/2010 | Karaki ................. G09G 5/006 345/1.3 |
| 2010/0309218 A1 | 12/2010 | Suen et al. |
| 2011/0103013 A1 | 5/2011 | Furukawa |
| 2011/0121761 A1 | 5/2011 | Zhao |
| 2011/0176029 A1 | 7/2011 | Boydston et al. |
| 2012/0019633 A1 | 1/2012 | Holley |
| 2012/0033876 A1 | 2/2012 | Momeyer et al. |
| 2012/0062622 A1 | 3/2012 | Koyama et al. |
| 2012/0133837 A1 | 5/2012 | Furukawa |
| 2012/0287289 A1 | 11/2012 | Steinberg et al. |
| 2012/0307243 A1 | 12/2012 | Elliott |
| 2012/0313979 A1 | 12/2012 | Matsuura |
| 2013/0162696 A1 | 6/2013 | Matsumoto |
| 2013/0181884 A1 | 7/2013 | Perkins et al. |
| 2013/0226495 A1 | 8/2013 | Marcu et al. |
| 2013/0249377 A1 | 9/2013 | Hamer et al. |
| 2013/0272023 A1 | 10/2013 | Lai |
| 2014/0002718 A1 | 1/2014 | Spielberg |
| 2014/0009485 A1 | 1/2014 | Asanuma |
| 2014/0009505 A1 | 1/2014 | Moon et al. |
| 2014/0049571 A1 | 2/2014 | Erinjippurath et al. |
| 2014/0049983 A1 | 2/2014 | Nichol et al. |
| 2014/0125818 A1 | 5/2014 | Friend |
| 2015/0070402 A1 | 3/2015 | Shah et al. |
| 2015/0186097 A1 | 7/2015 | Hall |
| 2015/0229919 A1 | 8/2015 | Weber et al. |
| 2015/0339977 A1 | 11/2015 | Nathan et al. |
| 2015/0348479 A1 | 12/2015 | Kim et al. |
| 2015/0371405 A1 | 12/2015 | Zhao |
| 2016/0078802 A1 | 3/2016 | Liang et al. |
| 2016/0124091 A1 | 5/2016 | Kawahito et al. |
| 2016/0182790 A1 | 6/2016 | Horesh |
| 2016/0275835 A1 | 9/2016 | Yuan et al. |
| 2016/0335958 A1 | 11/2016 | Huang et al. |
| 2017/0032715 A1 | 2/2017 | Sutherland et al. |
| 2017/0032742 A1 | 2/2017 | Piper et al. |
| 2017/0061924 A1 | 3/2017 | Lee et al. |
| 2017/0069871 A1 | 3/2017 | Yim et al. |
| 2017/0171492 A1 | 6/2017 | Naito |
| 2017/0284630 A1 | 10/2017 | Sergenese et al. |
| 2017/0318178 A1 | 11/2017 | Debevec et al. |
| 2018/0018793 A1 | 1/2018 | Min et al. |
| 2018/0060014 A1 | 3/2018 | Son et al. |
| 2018/0090102 A1 | 3/2018 | Chappalli et al. |
| 2018/0091860 A1 | 3/2018 | Stokking et al. |
| 2018/0131160 A1 | 5/2018 | Zhang et al. |
| 2018/0235052 A1 | 8/2018 | Tada |
| 2018/0240409 A1 | 8/2018 | Li et al. |
| 2018/0342224 A1 | 11/2018 | Beon et al. |
| 2019/0064923 A1 | 2/2019 | Taniguchi |
| 2019/0080656 A1 | 3/2019 | Herranz et al. |
| 2019/0098293 A1 | 3/2019 | Lee et al. |
| 2019/0132560 A1 | 5/2019 | Grosse et al. |
| 2019/0172404 A1 | 6/2019 | Zhu |
| 2019/0209858 A1 | 7/2019 | Slaughter et al. |
| 2019/0212719 A1* | 7/2019 | Ono ................. G05B 19/4155 |
| 2019/0213951 A1 | 7/2019 | Li et al. |
| 2019/0244561 A1 | 8/2019 | Zong et al. |
| 2019/0295457 A1 | 9/2019 | Li et al. |
| 2019/0306477 A1 | 10/2019 | Nordback |
| 2019/0356940 A1 | 11/2019 | Mallett |
| 2019/0364309 A1 | 11/2019 | Von Braun et al. |
| 2019/0377535 A1 | 12/2019 | Rycyna et al. |
| 2020/0014904 A1 | 1/2020 | Wetzstein et al. |
| 2020/0027386 A1 | 1/2020 | Wang et al. |
| 2020/0037011 A1 | 1/2020 | Zong et al. |
| 2020/0043201 A1 | 2/2020 | Tanaka et al. |
| 2020/0098333 A1 | 3/2020 | Marcu |
| 2020/0126501 A1 | 4/2020 | Yamazaki et al. |
| 2020/0160791 A1 | 5/2020 | Chung |
| 2020/0184862 A1* | 6/2020 | Kim ................. G09F 9/35 |
| 2020/0225903 A1 | 7/2020 | Cohen |
| 2020/0280761 A1 | 9/2020 | Staples |
| 2020/0286424 A1 | 9/2020 | Thielemans et al. |
| 2020/0388210 A1 | 12/2020 | Thielemans et al. |
| 2020/0403117 A1 | 12/2020 | Fabien et al. |
| 2021/0005161 A1 | 1/2021 | Lee |
| 2021/0014385 A1 | 1/2021 | Boggavarapu et al. |
| 2021/0056937 A1 | 2/2021 | Sakai |
| 2021/0124174 A1 | 4/2021 | Tokunaga et al. |
| 2021/0125545 A1 | 4/2021 | Sohn et al. |
| 2021/0125570 A1 | 4/2021 | Kang et al. |
| 2021/0185778 A1 | 6/2021 | Otten |
| 2021/0201769 A1 | 7/2021 | Morris et al. |
| 2021/0217157 A1 | 7/2021 | Han et al. |
| 2021/0225267 A1 | 7/2021 | Thielemans et al. |
| 2021/0227270 A1 | 7/2021 | Braun |

(56) References Cited

U.S. PATENT DOCUMENTS

| | | |
|---|---|---|
| 2021/0266624 A1 | 8/2021 | Zong et al. |
| 2021/0295766 A1 | 9/2021 | Sugiyama et al. |
| 2021/0297717 A1 | 9/2021 | Braun |
| 2021/0306394 A1 | 9/2021 | Zong et al. |
| 2021/0321032 A1 | 10/2021 | Braun |
| 2021/0345058 A1* | 11/2021 | Itakura ............... H04R 27/00 |
| 2021/0366411 A1 | 11/2021 | Yang et al. |
| 2021/0383842 A1 | 12/2021 | Han et al. |
| 2021/0397398 A1 | 12/2021 | Han et al. |
| 2022/0014728 A1 | 1/2022 | Deighton |
| 2022/0020727 A1 | 1/2022 | Noh et al. |
| 2022/0059045 A1 | 2/2022 | Kobayashi et al. |
| 2022/0059607 A1 | 2/2022 | Murugan et al. |
| 2022/0060612 A1 | 2/2022 | Hochman et al. |
| 2022/0076615 A1 | 3/2022 | Ding et al. |
| 2022/0103738 A1 | 3/2022 | Deighton |
| 2022/0150456 A1 | 5/2022 | Steudel et al. |
| 2022/0191109 A1 | 6/2022 | Chen et al. |
| 2022/0246670 A1 | 8/2022 | Chen et al. |
| 2022/0254317 A1 | 8/2022 | Hochman et al. |
| 2022/0350562 A1 | 11/2022 | Wang et al. |
| 2022/0375387 A1 | 11/2022 | Deighton |
| 2022/0375403 A1 | 11/2022 | Cheng et al. |
| 2022/0382504 A1* | 12/2022 | Cioarga ............... G06F 3/147 |
| 2022/0413790 A1 | 12/2022 | Cai et al. |
| 2023/0013582 A1 | 1/2023 | Wang et al. |
| 2023/0154399 A1 | 5/2023 | Thielemans et al. |
| 2023/0162400 A1 | 5/2023 | Liu et al. |
| 2023/0162662 A1 | 5/2023 | Zhang et al. |
| 2023/0163142 A1 | 5/2023 | Lu et al. |
| 2023/0186821 A1 | 6/2023 | Hashempour et al. |
| 2023/0209207 A1 | 6/2023 | Hochman et al. |
| 2023/0274693 A1 | 8/2023 | Thielemans et al. |
| 2023/0282153 A1 | 9/2023 | Thielemans et al. |
| 2023/0298503 A1 | 9/2023 | Zhang et al. |
| 2023/0326175 A1 | 10/2023 | Zhang et al. |
| 2024/0022686 A1 | 1/2024 | Thielemans et al. |
| 2024/0044465 A1 | 2/2024 | Thielemans et al. |

FOREIGN PATENT DOCUMENTS

| | | | |
|---|---|---|---|
| BE | 1026226 A1 | | 11/2019 |
| CN | 102290003 A | | 12/2011 |
| CN | 206741357 U | | 12/2017 |
| CN | 207352560 U | | 5/2018 |
| CN | 110602875 A | | 12/2019 |
| CN | 110617000 A | | 12/2019 |
| DE | 102006054856 A1 | | 1/2009 |
| EP | 1172783 A1 | | 1/2002 |
| EP | 1780798 A1 | | 5/2007 |
| EP | 2323072 A1 | | 5/2011 |
| EP | 3099058 A1 | | 11/2016 |
| EP | 3139422 A2 | | 3/2017 |
| GB | 2469819 A | | 11/2010 |
| JP | 2007062892 A | * | 3/2007 |
| JP | 2019214445 A | * | 12/2019 |
| KR | 20170065163 A | | 6/2017 |
| TW | 200608327 A | | 3/2006 |
| TW | 200608328 A | | 3/2006 |
| WO | 2013186278 A1 | | 12/2013 |
| WO | 2015114720 A1 | | 8/2015 |
| WO | 2018164105 A1 | | 9/2018 |
| WO | 2019215219 A1 | | 11/2019 |
| WO | 2020253249 A1 | | 12/2020 |
| WO | 2021009719 A1 | | 1/2021 |
| WO | 2022013191 A1 | | 1/2022 |
| WO | 2022064062 A1 | | 3/2022 |
| WO | 2022087322 A1 | | 4/2022 |

OTHER PUBLICATIONS

Response to Belgian Search Report from Belgian Patent Application No. BE2023/5595, filed Mar. 21, 2024.

Extended European Search Report from European Patent Application No. EP23185674.1, Nov. 16, 2023.

Partial European Search Report from European Patent Application No. EP23198096, Nov. 29, 2023.

Extended European Search Report from European Patent Application No. EP23198096.2, Apr. 9, 2024.

Extended European Search Report from European Patent Application No. EP23190432.7, Feb. 12, 2024.

Extended European Search Report from European Patent Application No. EP23160521, Jul. 6, 2023.

Response to Extended European Search Report from European Patent Application No. EP23160521, dated Jan. 29, 2024.

Extended European Search Report from European Patent Application No. EP23218322.8, Mar. 27, 2024.

Extended European Search Report from European Patent Application No. EP23218336.8, Apr. 10, 2024.

Partial European Search Report from European Patent Application No. EP23218348.3, Apr. 30, 2024.

Extended European Search Report from European Patent Application No. EP23218353.3, Mar. 26, 2024.

Extended European Search Report from European Patent Application No. EP23218356.6, Apr. 5, 2024.

Extended European Search Report from European Patent Application No. EP23218377.2, Apr. 24, 2024.

Baker, Simon, "Pulse Width Modulation (PWM)", Mar. 17, 2015, 13 pages, TFT Central.

Burr, David, "Motion Perception: Human Psychophysics", Apr. 18, 2013, pp. 763-776, MIT Press.

Cast, Inc., "Understanding -and Reducing-Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.

Davis et al., "Humans perceive flicker artifacts at 500 Hz", Feb. 3, 2015, 4 pages, Nature, Scientific Reports.

Kang et al., "Nanoimprinted Semitransparent Metal Electrodes and Their Application in Organic Light-Emitting Diodes," May 21, 2007, 6 pages, Advanced Materials.

Larson, Jennifer, "How Many Frames Per Second Can the Human Eye See?", Oct. 20, 2020, 12 pages, retrieved from <https://www.healthline.com/health/human-eye-fps>.

Lee et al., "Solution-Processed Metal Nanowire Mesh Transparent Electrodes", Jan. 12, 2008, pp. 689-692, Nano Letters, vol. 8, No. 2.

Mackin et al., "High Frame Rates and the Visibility of Motion Artifacts", Jun. 30, 2017, 19 pages, SMPTE Motion Imaging Journal, vol. 126, Issue 5.

Thielemans, Robbie, "Displays Applications of LEDs", Handbook of Visual Display Technology, May 21, 2011, 14 pages.

Thielemans, Robbie, "LED Display Applications and Design Considerations", Handbook of Visual Display Technology, May 21, 2011, 5 pages, retrieved from https://link.springer.com/referenceworkentry/10.1007/978-3-540-79567-4_76.

Tobii Connect, "The speed of human visual perception", Sep. 14, 2022, 1 page, retrieved from <https://connect.tobii.com/s/article/the-speed-of-human-perception?language=en_US>.

Wikipedia, "MAC Address", 10 pages, retrieved from <https://en.wikipedia.org/wiki/MAC_address>.

Wilson, Derek, "Exploring Input Lag Inside Out", Jul. 16, 2019, 2 pages, retrieved from <https://www.anandtech.com/show/2803>.

Zhang, Yin, "Performance Characteristics of Lithium Coin Cells for Use in Wireless Sensing Systems", Jun. 17, 2012, 143 pages, All Theses and Dissertations, Brigham Young University.

"The Ins and Outs of HDR—Gamma Curves", Jun. 8, 2020, 3 pages, retrieved from <https://www.eizoglobal.com/library/management/ins-and-outs-of-hdr/index2.html>.

Extended European Search Report from corresponding EP Application No. EP18198749.6, Nov. 12, 2018.

International Search Report and Written Opinion from PCT Application No. PCT/EP2019/061804, Jun. 13, 2019.

Applicant's Amendment/Remarks filed at the EPO on Feb. 20, 2020 for PCT/EP2019/061804.

(56) References Cited

OTHER PUBLICATIONS

Applicant's Amendment/Remarks filed at the EPO on May 26, 2020 for PCT/EP2019/061804.
International Preliminary Report on Patentability from PCT/EP2019/061804, Jul. 10, 2020.
Belgian Search Report from BE Application No. 201905196, Aug. 13, 2019.
Search Report for BE 2019/05759 mailed Jan. 23, 2020, 18 pages.
Belgian Search Report for Belgian Patent Application No. BE2019/5970, Jul. 24, 2020.
Response to Belgian Search Report for Belgian Patent Application No. BE2019/5970, filed by Applicant at the Belgian Patent Office on Nov. 24, 2020.
Belgian Search Report from corresponding Belgian Application No. BE 202205007, Jun. 7, 2022.
Extended European Search Report from corresponding EP Application No. 22185014.2, Dec. 8, 2022.
Office Action from European Application No. 19722133.6, Jan. 19, 2023.
Belgian Search Report from Corresponding Belgian Patent Application No. BE202305595, Nov. 21, 2023.
Response to Belgian Search Report from Corresponding Belgian Patent Application No. BE2023/5595, filed Mar. 21, 2024.
Extended European Search Report from Corresponding European Patent Application No. EP23185674.1, Nov. 16, 2023.

* cited by examiner

FOCUSED SOUND AND INFOTAINMENT SYSTEM AND METHOD

TECHNICAL FIELD

The invention relates to an audio-visual system to be provided along a continuous path, comprising a directional sound system, a display system and a sensor system. The audio-visual system is particularly providing focused sound and infotainment to a person, living thing or object related to one of these, passing by the system and/or getting close thereto. The invention also relates to a moving staircase, escalator or walkway, for transporting persons, living things and/or objects, wherein such focused sound and infotainment system is provided. The invention further relates to a method for providing audio-visual information along a continuous path, particularly intended for and hence directed to a person, living thing or object related to one of these, being on the path and possible moving there along. A plurality of persons, living things or objects are also considered for the invented system and method.

BACKGROUND OF THE INVENTION

Several techniques are available to accomplish directional sound. Just like light, sound is a wave, and hence it can be manipulated similarly. For example, sound can be created in a narrow beam instead of standardly widespread propagation in all directions from the sound generating source. Focused audio can be particularly useful in museums or for exhibitions.

Solutions exist in the art where visuals are adapted depending on the public. People waiting for an elevator for example, can be presented different images or content on a display, depending on their number, the group, their age, their companionship of pets etc. In another example, analysis of the audience (e.g. gender, age) can be an interesting basis for (all or not interactive) entertainment of that audience, during a concert or live event. Further analysis (e.g. stature, hairdo) can be even more valuable for delivering targeted information in shopping area.

The problem however is, that despite the proposed techniques above, there is no all-in-one solution wherein sound and/or image particularly intended and customized for a person or object passing by, is moving together with that person or object changing position, in an extended environment where a plurality of persons or objects are passing by.

SUMMARY OF THE INVENTION

The aim of the invention is to provide focused sound and infotainment to humans, other living species such as animals e.g. pets and/or objects related to one of these (and in the vicinity thereof), when passing by in an extended environment. With passing by is meant for example that a person is walking e.g. along a path or corridor, or, in a motorized way, people are being transported or conveyed by means of a moving staircase, escalator or walkway.

According to a first aspect, the invention provides an audio-visual system to be provided along a continuous path, comprising a directional sound system, a display system and a sensor system. The path is not necessarily automated or motorized, but could also be a long (seemingly endless) pathway which can be followed, such as e.g. a pathway, corridor or extended passage. The audio-visual system hence appearing as continuous (seemingly endless). The audio-visual or sound visual system is of an extended nature in terms of place dimension, therefore one may say that the audio-visual or sound visual system is provided along a path, most likely an at least piece-wise continuous path, to thereby allow that sound emitted and/or the image displayed is moveable along the audio-visual system or sound visual system, exploiting the directional feature of the sound system and the ability of a display to project an image locally on a display. The display system may comprise of a sequence of displays (comprising of tiles), e.g. mounted next to each other, along the continuous path. The audio-visual system is configured to receive data detected by the sensor system for recognizing a person, living thing or object (related to the person or living thing, and in the vicinity thereof) in an area surrounding part of the audio-visual system; generate a sound control signal for emitting sound by means of the directional sound system (in the area surrounding part), connected with the sensor system, towards (and in accordance with) the person, living thing or object being recognized; generate an image control signal for displaying an image on part of the display system (in the area surrounding part), connected with the sensor system, in the area of (and in accordance with) the person, living thing or object being recognized; and transmit the sound and image control signals to the sound and display system respectively; characterized in that the sound emitted—i.e. to be heard by the person or living thing—and/or the image displayed—i.e. to be seen by the person or living thing—is moveable along the audio-visual system in accordance with the position and place of the person, living thing or object being recognized in the area surrounding part thereof. With part of the display system is meant for example one or more e.g. two (adjacent) displays (next to each other) of the sequence. Within the area of the person, living thing or object being recognized, the image generated may depend on the position of person, living thing or object. Optionally, the image may also depend on type of person, living thing or object. The sound emitted and/or image displayed being movable can be explained as follows. A person passing by e.g. a pathway or corridor where the audio-visual system is provided, is going from one area surrounding part (wherein he/she being recognized) to another. The sound and image intended for the recognized person passing by, is moving together with that person along the pathway or corridor that he/she is following. The generated sound control signal and image control signal are hence transmitted to particular part respectively of the directional sound system and of the display system, respectively directed towards or in the area where the person is specifically located.

According to an embodiment, the audio-visual system is also configured to receive data detected by the sensor system for recognizing a plurality of persons, living things or objects, in corresponding (or respective) plurality of area surrounding parts of the audio-visual system—these corresponding parts being separate and distinguishable, i.e. one person, living thing or object corresponding to one surrounding area wherein this one is recognized; generate a plurality of sound control signals (for corresponding plurality of area surrounding parts), for emitting sound by means of the directional sound system, connected with the sensor system, towards (and in accordance with) each of the persons, living things or objects being recognized (in each of the corresponding area surrounding parts); generate a plurality of image control signals (for corresponding plurality of area surrounding parts), for displaying an image on part of the display system, connected with the sensor system, in the area of (and in accordance with) each of the persons, living things or objects being recognized (in each of the corresponding area surrounding parts); and transmit the plurality of sound and image control signals (for corresponding plurality of area surrounding parts) to the sound and display system respectively.

The directional sound system may comprise of one or more of a piezo (e.g. transducer) or ultrasonic element or a horn system, and optionally may comprise of one or more amplifiers. In case of one, such piezo or ultrasonic element may be provided onto a gyroscopic movement system or drone that tracks a (plurality of) person, living thing or object. In case of more piezo's or ultrasonic elements, one could think about a linear array. Moreover, the directional sound system or the sensor system may comprise one or more directional microphones, e.g. for capturing sound from a (plurality of) person, living thing or object, in order to interact by means of responding with sound or image from the audio-visual system. In case of one, such directional microphone could be mounted onto a mechanical rotational device that tracks a (plurality of) person, living thing or object. In case of more directional microphones, one could think about a linear array.

The display system may comprise of a plurality of LED display panels, projection displays, or LCD panels. In addition, the display system may further comprise one or more filters for adapting the viewing angle of the image shown. The adapting, e.g. narrowing, may be such that respective images to be viewed for e.g. 2 persons at 1.5 m distance from each other are not being disturbed. In between two neighboring respective images, possibly there is nothing viewed, or for example a blend region could be provided (e.g. image fit for both of the 2 persons). Particularly, while referring to the embodiment wherein the audio-visual system is also configured to receive data detected by the sensor system for recognizing a plurality of persons, living things or objects, such adapting can be based on the amount of persons, living things or objects amongst the plurality thereof being recognized. The display system may comprise of a continuous LED display comprising of a plurality (e.g. an array) of LED tiles having each a LED processor, being controlled by an image splitter and a graphical card or graphics engine.

According to an embodiment, the audio-visual system further comprises a storage system, comprising of a sound storage part and an image storage part having both multiple playout capability. Such audio-visual system may even further comprise a selector system, for selecting sound and/or image from the storage system (depending on the position/type of person, living thing or object in the area surrounding part).

The sensor system may comprise of at least one of a camera, an IR sensor (e.g. proximity, presence or movement sensor), or an acoustic sensor (e.g. distance or position sensor). Preferably there are multiple sensors in an array, mainly used to detect position of person, living thing or object, in order to determine sound to be emitted (local or focused audio) and image (local or directional content) to be shown. The camera or sensors may be configured to distinguish a person from another living thing, or from an object, and in case a person is recognized may be able to perform people scanning including face and/or gait recognition, possibly based on AI techniques wherein the sensor system is equipped or trained with person recognition methods.

According to a second aspect, the invention provides a moving staircase, escalator or walkway for conveying or transporting a person, living thing or object, provided with the audio-visual system in accordance with the first the aspect.

According to a third aspect, the invention provides a method for providing audio-visual information along a continuous path. The method comprises the following steps: (i) providing an audio-visual system comprising of a directional sound system, a display system and a sensor system; (ii) receiving data detected by the sensor system for recognizing a person, living thing or object (related to the person or living thing, and in the vicinity thereof) in an area surrounding part of the audio-visual system; (iii) generating a sound control signal for emitting sound by means of the directional sound system (in the area surrounding part), connected with the sensor system, towards (and in accordance with) the person, living thing or object being recognized; (iv) generating an image control signal for displaying an image on part of the display system (in the area surrounding part), connected with the sensor system, in the area of (and in accordance with) the person, living thing or object being recognized; and (v) transmitting the sound and image control signals to the sound and display system respectively, such that the sound emitted and/or the image displayed is directed towards the person, living thing or object being recognized—and where being specifically located—(in the area surrounding part), even when the person, living thing or object is moving along the continuous path.

According to an embodiment, the method further comprises the step of (vi) receiving and interpreting sound emitted and/or gesture made by the person, living thing or object being recognized (in the area surrounding part). The method may even further comprise the step of (vii) interacting with the person, living thing or object being recognized (in the area surrounding part) by means of interrogating or responding, meaning directing questions or answers thereto.

DETAILED DESCRIPTION OF THE INVENTION

The invention relates to an environment, wherein focused sound and infotainment are provided for people or (other living) things passing by or staying/moving around in a nearby i.e. close thereto limited area, and wherein such people or things are detected by means of a detection system e.g. comprising cameras and sensors. Focused sound is understood as sound being directed to (or from) the people, while infotainment may be dedicatedly presented onto a screen, e.g. large continuous LED display with time and space varying content, providing a combination of information and entertainment. With the focused sound and infotainment system, images and sound may change depending on the position or location of the persons or objects passing by, and possibly also depending on their (visible, intrinsic)

features such as for example a person's gender or age, or the type of object which can be e.g. a car or bicycle, or for example a mobile device such as a smartphone. In at least some examples, focused sound may be directed to a passerby in order to give him/her information or instructions when walking or passing by, and herewith for example suggesting or directing him/her to look at the display for further information or entertainment.

The invention also relates to a moving staircase, escalator or walkway, for transporting or conveying persons, living things and/or objects, wherein such focused sound and infotainment system is provided.

The invention further relates to a method for providing audio-visual information, in particular focused sound and infotainment, along an extended environment, in particular a continuous (seemingly endless) path, pathway or corridor. Such focused sound and infotainment being particularly intended for and hence directed to a person, living thing or object related to one of these, being on the path and possible moving there along. The continuous path can be a fixed static path, or either a moving (motorized) path such as a moving staircase, escalator or walkway onto which the person, living thing or object is transported or conveyed. In other words, either the person, living thing or object can be moving and thus change position within the environment, or either the path they are on, can be movable. Moving staircases or other conventional passenger conveyors, typically include a chain of steps that travel in a loop to provide a continuous movement along a specified path.

A plurality of persons, living things and/or objects can also be considered for the system and method as mentioned above, in accordance with the invention. Such plurality being either located approximately in the same position or spot with regard to the audio-visual system, or clearly separated from each other and being at distant position e.g. 1.5 m away from each other.

The invention is now further described by means of different embodiments, for which is also referred to FIG. 1 to 6.

Figure 1:
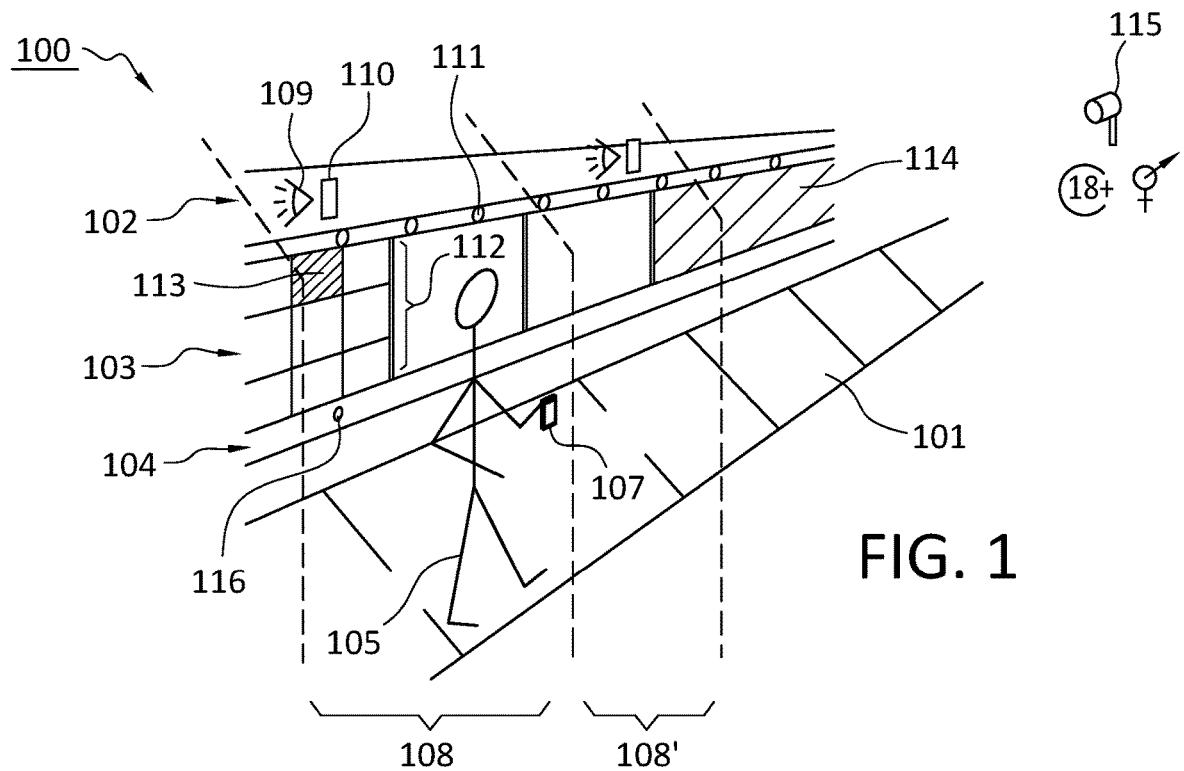
FIG. 1 illustrates an embodiment of the audio-visual system in accordance with the invention.

FIG. 1 illustrates an embodiment of the audio-visual system 100 in accordance with the invention. As depicted, the audio-visual system 100 is particularly intended to be provided in an extended area or environment, and hence the system 100 itself being quite large and extended. Here, the system 100 is elongated along a continuous path 101, which can be a static pathway or corridor, but a moving or motorized version is also possible, such as for example a moving staircase, escalator or walkway. The audio-visual system 100 comprises a directional sound system 102, a display system 103 and a sensor system 104. As shown, a person 105 is walking along the continuous path 101 close to the audio-visual system 100. The audio-visual system 100 is typically mounted and installed not too far away from the continuous path 101, such that the person 105 present or moving thereon can be detected by means of the sensor system 104, and hence sound and image can be provided for this person 105. The person 105 is carrying for example a mobile device 107 such as e.g. his smartphone. The object 107 he or she is carrying, is thus related to the person 105 and in the vicinity of that person 105. The audio-visual system 100 is configured for not only detecting the person 105 but also another living species, such as a pet, as well as an object related to the person 105 or e.g. pet, and in the vicinity thereof, for example carried by the person 150 or pet. One could also think of a car or bicycle as possible object, being controlled by a person. Moreover, the audio-visual system 100 is also capable of recognizing people amongst other living species or objects.

Further depicted in FIG. 1, the detection by means of the sensor system 104 is compartmentalized in accordance with the person, living thing or object being close enough to the system, therefore within an area surrounding part 108 of the audio-visual system 100. The person 105 walking on the path 101, and positioned within the area surrounding part 108 is detected and recognized by means of the sensor system 104, which may comprise of a camera 115 and a sensor 116, preferably comprising of a plurality of cameras and sensors. Visible or IR (infrared) cameras could be used, whereas possible sensors are for example an IR sensor (e.g. proximity, presence or movement sensor), infrared LED with IR detection and reflector side, or an acoustic sensor (e.g. distance or position sensor). According to an embodiment, the sensor system 104 comprises multiple sensors 116 and/or cameras 115, possibly installed or mounted in an array, along the audio-visual system 100 following an elongated continuous path 101. The sensor system 104 is mainly used to detect and determine the position of the person 105 (or other (living) thing) on the path 101. This positional relationship may determine change of local content (e.g. change image, information) and directed sound (e.g. change music, audio). Based on the detection and recognition of the person 105 within the area surrounding part 108, the audio-visual system 100 will provide focused sound and content to that person 105 in this area surrounding part 108. The focused sound is emitted by the directional sound system 102, after having generated and transmitted a sound control signal to the sound system 102. Similarly, content or images are displayed after having generated and transmitted an image control signal to the display system 103. Such content or images, e.g. in the form of information or entertainment, being for example text, static pictures or video, are shown on part of the display system 103 where the person 105 is walking or passing by, i.e. the person 105 being positioned in the area surrounding part 108. In accordance with the invention, whenever the person 105 is now moving along the path 101, herewith entering a neighboring area surrounding part 108', the audio-visual system 100 will further provide focused sound and infotainment to the person 105 in the neighboring area surrounding part 108'. Providing such focused sound and infotainment may be further continued (in further neighboring area surrounding parts) along the entire continuous path 101 where the audio-visual system 100 is present. Depending on the person 105 standing still for a moment or walking faster or slower, the focused sound and infotainment will move along. As a result, the focused sound and infotainment is not only provided to the person 105, but will move simultaneously at the person's pace. Along the path 101, it is of course possible that the sound and content for the person 105 changes (while moving), e.g. depending on his/her behavior (or e.g. requests, questions asked, see interactivity discussed in further paragraph) during passing by.

According to an embodiment, the sensor system 104 may comprise of cameras 115 and sensors 116 not only configured to distinguish a person 105 from another living thing, or from an object 107, but also, in case for example a person 105 is recognized to do face and/or gait recognition of that person 105, possibly based on AI (artificial intelligence) techniques wherein the sensor system 104 is equipped or trained with person recognition methods. Such face and/or gait recognition may lead for instance to determining age and/or gender of the person 105 being recognized.

According to an embodiment, as illustrated in FIG. 1, the directional sound system 102 comprises speakers 109, corresponding amplifiers 110, as well as directional microphones 111. For example, per area surrounding part 108, one speaker 109 plus amplifier 110, and a few microphones 111 may be provided. The speaker 109 may be based on piezo technique, making use of an ultrasonic element, or could be a horn system. Here, the microphones 111 appear as a (linear) array, although other models could also be thought of. Alternatively, for example one mechanical rotational (sound capturing) device could be provided as microphone per area surrounding part 108. The microphones 111 can capture sound or words that come from a person or people passing by. According to an embodiment, the microphones 111 send audio signals representing the sound captured to a computing device, which can perform natural language processing to determine what, if anything, the person said, or which can analyze the audio signals to determine an ambient noise level. With the microphones 111 installed with the directional sound system 102, or more generally with the audio-visual system 100, the audio-visual system 100 is not only capable of delivering sound and content, but enables the system 100 also to capture audio (e.g. people's voice, a dog barking). Having sufficient intelligence provided in the system 100, it could be even possible to create interactivity of the system 100 with people passing by. For example, based on questions asked by the system 100 and directed to someone passing by, responses could be given from that someone, to be captured by the system 100, and interpreted thereafter. As result from the interpretation by the system 100, someone could receive very specific and dedicated information he/she needs. According to an embodiment, speakers may also receive data e.g. sound signals such as voice of a person passing by, and in response thereto, output audio feedback to this person passing by.

Further, according to the embodiment, the display system 103 comprises a plurality of display panels 112, e.g. LED display panels. Alternatively, projection displays, or LCD panels for instance could also be used for the display system 103. For example, per area surrounding 108, a sequence of two (LED) display panels 112 could be provided. Each of the (LED) display panels 112 may comprise of a plurality of (LED) tiles 113 having each a (LED) processor being controlled by an image splitter and a graphical card or graphics engine, as being further discussed with the description of FIG. 5. The display system 103, or each of its plurality of display panels 112, in turn each of its plurality of tiles 113, may further comprise a filter 114, for example for adapting (e.g. narrowing) the viewing angle of the image shown thereon. By narrowing the viewing angle for example, the image or content is only seen or viewable for the person 105 just in front of the display, or in its region e.g. within the area surrounding part 108. The display system 103 can present text, as well as pictures, videos or video clips, or graphical representations to people passing by.

Figure 2:
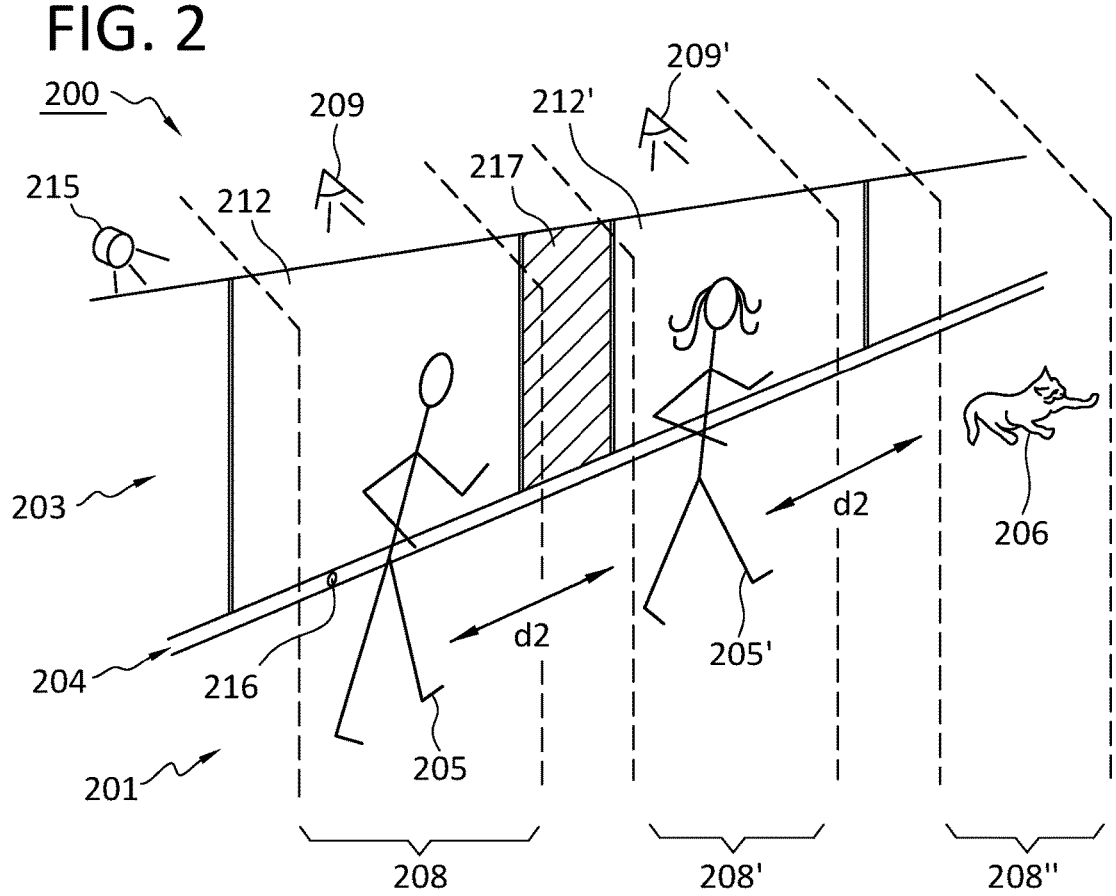
FIG. 2 illustrates another embodiment of the audio-visual system in accordance with the invention.

FIG. 2 illustrates another embodiment of the audio-visual system 200 in accordance with the invention. As shown, the audio-visual system 200 is again provided along a continuous path 201, onto which two persons 205, 205' and one dog 206 are walking. The persons 205, 205' are at a certain distance d1 from each other, e.g. d1 is about 1.5 m. They are positioned within respective area surrounding part 208, 208' wherein they can be detected and recognized by means of the sensor system 204, comprising of cameras 215 and sensors 216. The dog 206 is at a further distance d2, hence also at a separate location onto the path 201, and detectable and recognizable within its area surrounding part 208".

Suppose that the first person 205 left on the path 201 is a man of approximately 40 years old. With the sensor system 204 including cameras 215 and sensors 216, the audio-visual system 200 may recognize the first person 205 on the path 201, and may be even capable of recognizing his gender and age using for example face and/or gait recognition. The audio-visual system 200 knowing now that the person 205 is a man of about 40, the directed sound and content provided could be particularly chosen as something statistically (or learned from AI experience) popular for the average man of 40, and thus showing e.g. a car advertisement on the part 212 of the display system 203 while emitting audio for corresponding car trailer from the speaker 209. A little further on the path 201, at a distance d1 from the first person 205, a second person 205' is present and passing by, e.g. alternately standing and walking, maybe also running. Suppose this second person 205' is a woman of approximately 20 years old. With the sensor system 204, the audio-visual system 200 can again recognize the second person 205' on the path 201, including her gender and age. Based on the second person's profile, i.e. female of about 20, the audio-visual system 200 can provide content and sound which could be of particular interest for her. For example, it may be popular for young women of that age to go shopping, buy new clothes, and hence on the part 212' of the display system 203 e.g. clothing advertisement is presented while emitting audio for corresponding clothing commercial from the speaker 209'.

According to an embodiment, as illustrated in FIG. 2, a blend region 217 is provided on the display system 203 in between the parts 212, 212' particularly intended for the first and second person 205, 205' respectively. In case for example the person's 205, 205' are far enough from each other but not too far, such blend region 217 could be useful, onto which other content is shown, and moreover, specifically now content can be shown that is interesting for both the first and the second person 205, 205' passing by. Hence, the name blend region 217 for the display part in between parts 212, 212'. For the blend region 217, for instance could be advertised (by the audio-visual system 200) for a restaurant in the neighborhood.

The content here discussed above, is now particularly advertising, however, the audio-visual system 200 may be programmed to show entirely different content as well. For example, the path 201 being a moving walkway for people arriving (just landed) in an airport building, the content shown and sound emitted for someone passing by with his/her luggage could be practical tourist information for a person visiting the city or country where the airport is located. Or, it could also be pure entertainment, to provide video or images of a popular band or music artist while playing their music through the speakers (e.g. one at the time, one by one while passing by) of the directional sound system. Suppose now that on the path 201, at a distance d2 from the second person 205', a dog 206 is all of a sudden appearing on the path 201, and the path 201 is e.g. a moving walkway. For safety reasons, it could be recommended to have the dog 206 removed from the moving walkway as soon as possible. Hence, an embodiment could be that, whenever an animal such as a pet (e.g. dog) is appearing on the path, then focused sound is emitted, possible also images can be shown in the area of the dog running on a moving walkway all of a sudden. The selected focused sound and images are then for example typically chosen to keep the dog away from the moving walkway, e.g. make the dog leave by emitting a sharp whistle signal.

Figure 3:
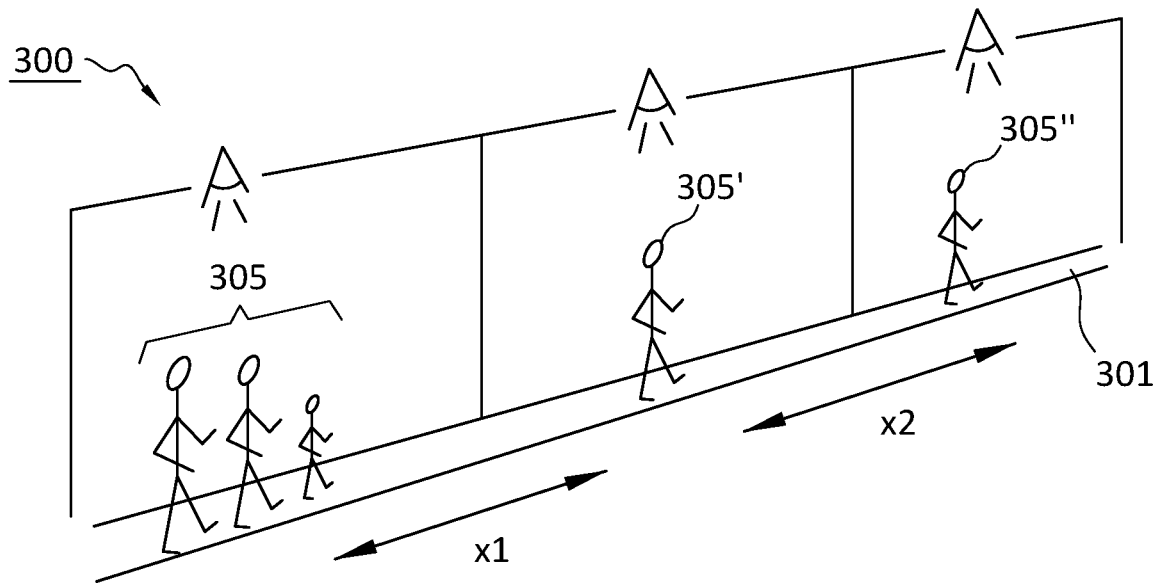
FIG. 3 illustrates further embodiment of the audio-visual system in accordance with the invention.

FIG. 3 illustrates further embodiment of the audio-visual system 300 in accordance with the invention. As depicted, the audio-visual system 300 is again provided along a continuous path 301, onto which persons 305, 305', 305" are walking or passing by. The persons 305, 305', 305" are at a certain distance x1, x2 from each other, for instance a few meters from each other. For this particular embodiment, the situation is shown of a group of persons 305, here three, being together and (standing or remaining) close to each other within an area surrounding part 308. According to the embodiment, the audio-visual system 300 is capable to detect someone or something on the path 301, and even it is feasible again to recognize whether a person, living thing or object is passing by. Hence, the group of persons 305 on the path 301 are recognized. Depending now on the configuration of the audio-visual system 300, meaning for example how it is programmed, the group of persons 305 could be interpreted as a whole for profiling and providing dedicated sound and content, or it could also be that the system 300 is programmed to further analyze the group of persons 305, and based on this analysis to provide particular directed audio and information. For instance, it could be that the group of persons 305 comprises mainly women at the age of 30, and hence the system 300 choses or decides to bring a perfume advertisement via focused sound and images. Another example could be, that there are children in the group of persons 305, and the system 300 therefore gives priority to them to provide entertainment and perhaps gaming for kids. With FIG. 3, a response is given to the question 'what happens in case of a plurality of persons, living things or objects within an area surrounding part?', and in line therewith for example 'which of these is recognized for generating controlled sound and image?'.

According to an embodiment, wherein persons are wearing AR/VR glasses as, for example, described in the particular gaming area setting in U.S. patent application Ser. No. 17/865,096, filed on Jul. 14, 2022, which is incorporated herein by reference, then the content could also be individualized per person, according to the glasses worn.

Figure 4:
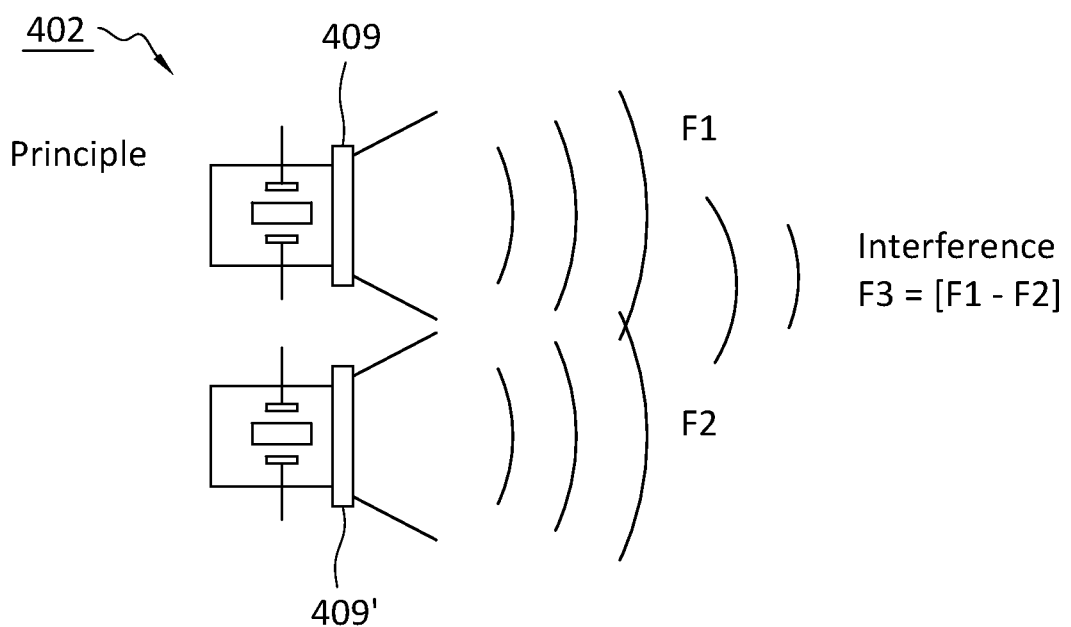
FIG. 4 illustrates a principal embodiment of the directional sound system in accordance with the invention.

FIG. 4 illustrates a principal embodiment of the directional sound system 402 in accordance with the invention. As mentioned earlier, the directional sound system may comprise of speakers, which could be based on piezo (i.e. transducers), making use of an ultrasonic element, or for which a horn system could also be a useful option. The sound system is possibly a linear array of speakers along the length of the audio-visual system following an elongated path. Alternatively, the sound system could be a gyroscopic movement system (or a plurality thereof) within an area surrounding part, and this for an audio-visual system comprising of multiple area surrounding parts, hence multiple gyroscopic movement systems are possibly installed within the entire system. Instead of fixed install array or gyroscope version of speakers, one could also think of a drone system being used, onto which (part of) the sound system could be provided or mounted. In combination (partly) with the sensor system, it would even be possible maybe to provide both (part of) the sound system and for example cameras and/or sensors, hence (part of) the sensor system on the drone system. A schematic representation and interference principle for a situation of two ultrasonic speakers 409, 409' comprising of ultrasonic transducers being illustrated in FIG. 4. Herewith is now shown how an ultrasonic wave can be converted into a sound wave that can be heard. In order to 'perceive' an ultrasonic sound, an audible frequency can be generated from two supersonic sources with a small frequency difference. For example, a tone of 1 kHz can be obtained from two ultrasonic tones of 40 kHz and 41 kHz. As seen in FIG. 4, where two ultrasonic waves interfere, a sound (with frequency F3) is perceived in the audio region. In particular, at the points where ultrasonic waves with frequencies F1 and F2 interfere, sound with a frequency of F3 can be heard. According to an embodiment, active cancellation of waves is also a possibility to achieve directive sound.

Figure 5:
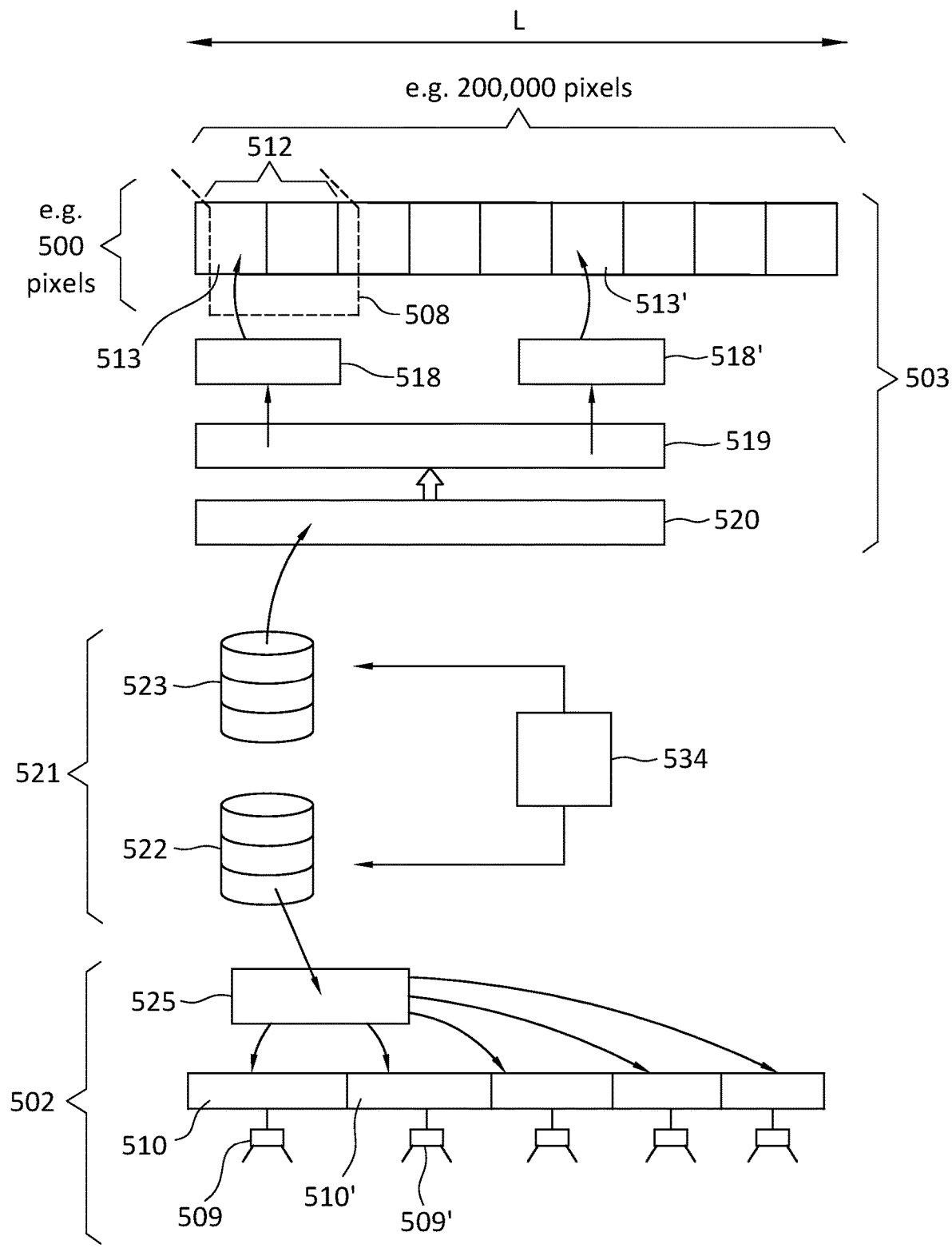
FIG. 5 illustrates an embodiment of the system setup for the audio-visual system in accordance with the invention.

FIG. 5 illustrates an embodiment of the system setup for the audio-visual system 500 in accordance with the invention. As earlier discussed, the audio-visual system 500 comprises a display system 503. The display system 503 here is composed of a plurality of panels 512 comprising of tiles 513, 513'. The display system 503 has for example a resolution of 500×20.000 pixels along the entire length L of the audio-visual system 500. The array or sequence of LED tiles 513, 513' is 500 pixels high and 20.000 pixels long. Each LED tile 513, 513' has a corresponding LED processor 518, 518', wherein all LED processors 518, 518' are controlled by an image splitter 519 and a graphical card or graphics engine 520. In addition, the audio-visual system 500 also comprises a storage system 521, comprising of a sound storage part 522 for storing audio, and an image storage part 523 for storing video clips and other image data, having both multiple playout capability, to accommodate a plurality of persons, living things and/or objects. The audio-visual system 500 further comprises a selector system 524, for selecting sound and/or image from the storage system 521. This selection is for example depending on the position and/or type of person, living thing or object present in the area surrounding part 508 while passing by the audio-visual system 500. The selector system 524 may select for the required or appropriate image or video clip, including its relative position, or for local audio to be played. It is noted that some (location) calibration may be needed here. Whereas the image storage part 523 being connected with the display system 503, the sound storage part 522 is connected with the directional sound system 502. The directional sound system 502 is here represented, comprising an audio processor 525 with digital input and multiple output channels. As yet mentioned above, the directional sound system 502 may further comprise an array of amplifiers 510, 510' and corresponding speakers 509, 509' connected therewith. As shown in FIG. 5, the audio processor 525 is here connected with the array of amplifiers 510, 510' and speakers 509, 509'.

Figure 6:
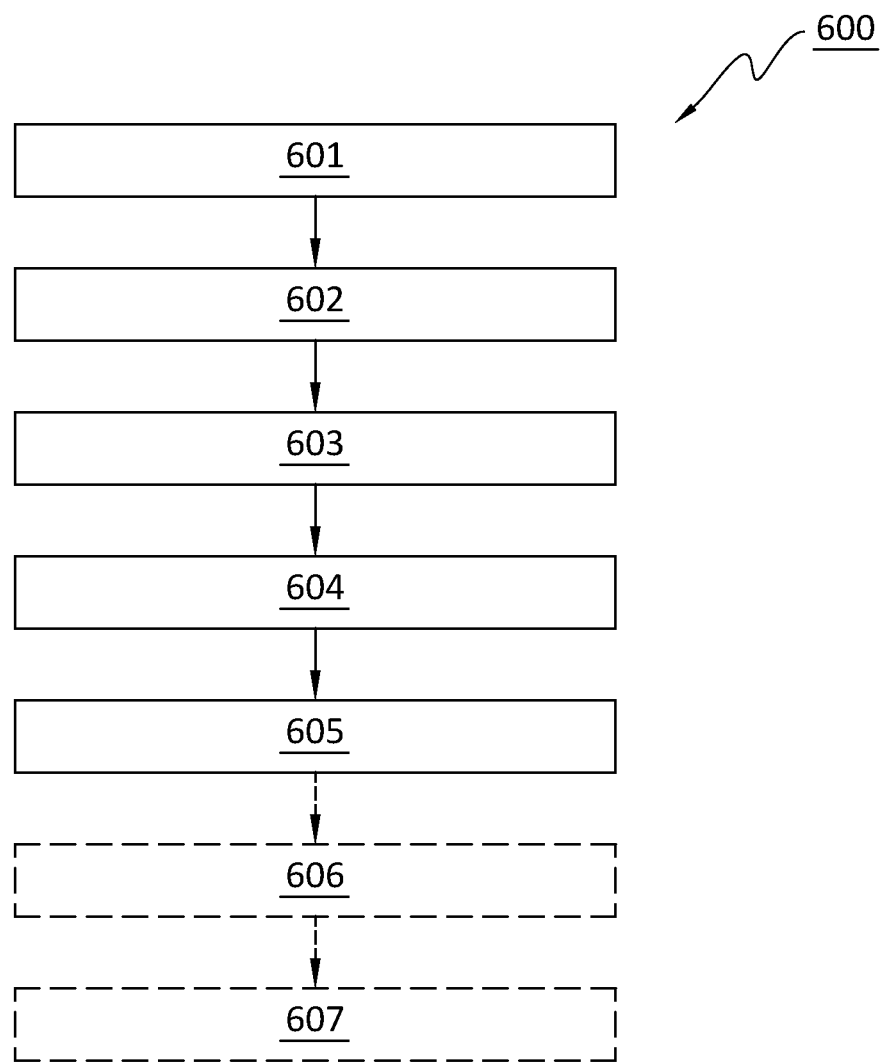
FIG. 6 illustrates flow chart embodiment of the method for providing audio-visual information along a continuous path in accordance with the invention.

FIG. 6 illustrates flow chart embodiment of the method 600 for providing audio-visual information along a continuous path in accordance with the invention. The method comprises different steps as herewith described. In a first step 601, an audio-visual system is provided comprising of a directional sound system, a display system and a sensor system. Next, during a second step 602, data detected by the sensor system is received for recognizing a person, living thing or object (related to said person or living thing, and in the vicinity thereof) in an area surrounding part of the audio-visual system. In a third step 603, a sound control signal is generated for emitting sound by means of the directional sound system (in the area surrounding part), connected with the sensor system, towards (and in accordance with) the person, living thing or object being recognized. A fourth step 604 comprises, generating an image control signal for displaying an image on part of the display system (in the area surrounding part), connected with the sensor system, in the area of (and in accordance with) the person, living thing or object being recognized. In a fifth step 605, the sound and image control signals are transmitted to the sound and display system respectively, such that the sound emitted and/or the image displayed is directed towards the person, living thing or object being recognized (in the area surrounding part), even when the person, living thing or object is moving along the continuous path. The method 600 may also comprise additional step 606 of receiving and interpreting sound emitted and/or gesture made by the person, living thing or object being recognized (in the area surrounding part). The method 600 may further comprise step 607 of interacting with the person, living thing or object being recognized (in the area surrounding part) by means of interrogating or responding, meaning directing questions or answers thereto.

Combinability of Embodiments and Features

This disclosure provides various examples, embodiments, and features which, unless expressly stated or which would be mutually exclusive, should be understood to be combinable with other examples, embodiments, or features described herein.

In addition to the above, further embodiments and examples include the following:

1. An audio-visual system to be provided along a continuous path, the audio-visual system comprising:
    a directional sound system, a display system, and a sensor system,
    wherein said audio-visual system is configured to receive data detected by the sensor system for recognizing a person, living thing or object in an area surrounding part of the audio-visual system;
    generate a sound control signal for emitting sound by means of the directional sound system, which is connected with the sensor system, towards said person, living thing or object being recognized;
    generate an image control signal for displaying an image on part of the display system, which is connected with the sensor system, in the area of said person, living thing or object being recognized; and
    transmit said sound and image control signals to said sound and display system respectively; and
    emit sound by the directional sound system and/or display an image by the display system such that the emitted sound and/or the image displayed is directed towards said person, living thing or object being recognized as said person, living thing or object moves along said continuous path.

2. The audio-visual system according to any or a combination of 1 above or 3-14 below, wherein the audio-visual system is configured to
    receive data detected by the sensor system for recognizing a plurality of persons, living things or objects, in corresponding plurality of area surrounding parts of the audio-visual system;
    generate a plurality of sound control signals, for emitting sound by means of the directional sound system, connected with the sensor system, towards each of said persons, living things or objects being recognized;
    generate a plurality of image control signals, for displaying an image on part of the display system, connected with the sensor system, in the area of each of said persons, living things or objects being recognized; and
    transmit said plurality of sound and image control signals to said sound and display system respectively.

3. The audio-visual system according to any or a combination of 1-2 above or 4-14 below, wherein said directional sound system comprises a piezo, a ultrasonic element, a horn system, and/or one or more amplifiers.

4. The audio-visual system according to any or a combination of 1-3 above or 5-14 below, wherein said directional sound system or said sensor system further comprises one or more directional microphones.

5. The audio-visual system according to any or a combination of 1-4 above or 6-14 below, wherein said display system comprises a plurality of LED display panels, projection displays, or LCD panels.

6. The audio-visual system according to any or a combination of 1-5 above or 7-14 below, wherein said display system further comprises one or more filters for adapting the viewing angle of the image shown.

7. The audio-visual system according to any or a combination of 1-6 above or 8-14 below, wherein said display system further comprises one or more filters for adapting the viewing angle of the image shown, and said adapting is based on the amount of persons, living things or objects amongst said plurality thereof being recognized.

8. The audio-visual system according to any or a combination of 1-7 above or 9-14 below, wherein said display system comprises a continuous LED display comprising of a plurality of LED tiles, each of the LED tiles having a LED processor, being controlled by an image splitter and a graphical card or graphics engine.

9. The audio-visual system according to any or a combination of 1-8 above or 10-14 below, further comprising a storage system, comprising a sound storage part and an image storage part, each of the sound storage part and the image storage part having multiple playout capability.

10. The audio-visual system according to any or a combination of 1-9 above or 11-14 below, further comprising a selector system for selecting sound and/or one or more images from the storage system.

11. The audio-visual system according to any or a combination of 1-10 above or 12-14 below, wherein said sensor system comprises a camera, an IR sensor, and/or an acoustic sensor.

12. The audio-visual system of 11 above, wherein said camera, IR sensor, or acoustic sensor is configured to distinguish a person from another living thing, or from an object.

13. The audio-visual system of 11 above, wherein said camera, IR sensor, or acoustic sensor is configured to distinguish a person from another living thing, or from an object, and in a case a person is recognized, said camera, IR sensor, or acoustic sensor is configured to perform people scanning including face and/or gait recognition.

14. The audio-visual system according to any or a combination of 1-13 above, wherein said camera, IR sensor, or acoustic sensor is configured to perform said people scanning including face and/or gait recognition based on AI techniques wherein the sensor system is equipped or trained with person-recognition methods.

15. A moving staircase, escalator or walkway, for transporting a person, living thing or object, comprising the audio-visual system according to any or a combination of 1-14 above.

16. A method for providing audio-visual information along a continuous path, said method comprising the steps of:
    providing an audio-visual system comprising of a directional sound system, a display system and a sensor system;

receiving data detected by the sensor system for recognizing a person, living thing or object in an area surrounding part of the audio-visual system;
generating a sound control signal for emitting sound by means of the directional sound system, which is connected with the sensor system, towards said person, living thing or object being recognized;
generating an image control signal for displaying an image on part of the display system, which is connected with the sensor system, in the area of said person, living thing or object being recognized; and
transmitting said sound and image control signals to said sound and display system respectively;
emitting sound by the directional sound system and/or displaying an image by the display system such that the emitted sound and/or the image displayed is directed towards said person, living thing or object being recognized as said person, living thing or object moves along said continuous path.

17. The method according to any or a combination of 16 above or 18 below, further comprising the step of receiving and interpreting sound emitted and/or gesture made by said person, living thing or object being recognized.

18. The method according to any or a combination of 16 or 17 above, further comprising the step of interacting with said person, living thing or object being recognized by means of interrogating or responding, meaning directing questions or answers thereto.

19. A hardware storage device having stored thereon computer executable instructions which, when executed by one or more processors of a computer system of an audio-visual system comprising of a directional sound system, a display system, and a sensor system, configure the audio-visual system to perform the following for providing audio-visual information along a continuous path:
receive data detected by the sensor system for recognizing a person, living thing or object in an area surrounding part of the audio-visual system;
generate a sound control signal for emitting sound by means of the directional sound system, connected with the sensor system, towards said person, living thing or object being recognized;
generate an image control signal for displaying an image on part of the display system, connected with the sensor system, in the area of said person, living thing or object being recognized; and
transmit said sound and image control signals to said sound and display system respectively;
emit sound by the directional sound system and/or display an image by the display system such that the emitted sound and/or the image displayed is directed towards said person, living thing or object being recognized as said person, living thing or object moves along said continuous path.

The invention claimed is:

1. An audio-visual system to be provided along a continuous path, the audio-visual system comprising:
a directional sound system, a display system, and a sensor system,
wherein said display system comprises a continuous LED display comprising a plurality of LED tiles,
wherein said audio-visual system is configured to
receive data detected by the sensor system for recognizing a person, living thing or object in an area surrounding part of the audio-visual system;
generate a sound control signal for emitting sound by means of the directional sound system, which is connected with the sensor system, towards said person, living thing or object being recognized;
generate an image control signal for displaying an image on part of the display system, which is connected with the sensor system, in the area of said person, living thing or object being recognized; and
transmit said sound and image control signals to said sound and display system respectively; and
display an image by the display system such that the image displayed is directed towards said person, living thing or object as said person, living thing or object, and the image displayed moves along said continuous path such that the image displayed moves across the plurality of LED tiles together with said person, living thing or object along the audio-visual system along said continuous path continuously and simultaneously at a pace of said person, living thing or object, and
wherein said display system further comprises one or more filters for adapting a viewing angle of the image shown, and
wherein said one or more filters are configured to adapt the viewing angle based on the amount of persons, living things or objects amongst said plurality thereof being recognized.

2. The audio-visual system of claim 1, wherein the audio-visual system is configured to
receive data detected by the sensor system for recognizing a plurality of persons, living things or objects, in corresponding plurality of area surrounding parts of the audio-visual system;
generate a plurality of sound control signals, for emitting sound by means of the directional sound system, connected with the sensor system, towards each of said persons, living things or objects being recognized;
generate a plurality of image control signals, for displaying an image on part of the display system, connected with the sensor system, in the area of each of said persons, living things or objects being recognized; and
transmit said plurality of sound and image control signals to said sound and display system respectively.

3. The audio-visual system of claim 2, wherein the plurality of area surrounding parts of the audio-visual system include a first area surrounding part for a first person, living thing or object and a second area surrounding part for a second person, living thing or object, and
wherein the audio-visual system displays a first image on a first part of the display system for the first area surrounding part and a second image on a second part of the display system for the second area surrounding part, and
wherein the audio-visual system is further configured to display a blended image in a blend region between the first part of the display system and the second part of the display system such that the blended image is simultaneously viewable by both the first person, living thing or object in the first area surrounding part and the second person, living thing or object in the second area surrounding part.

4. The audio-visual system of claim 2,
wherein, upon receiving data detected by the sensor system for recognizing a plurality of persons, living things or objects, including a first person, living thing, or object and a second person, living thing, or object, the first person, living thing, or object being in a corresponding first area surrounding part and the second person, living thing, or object being in a corresponding second area surrounding part, the audio-visual system displays a first image on a first part of the display system for the first area surrounding part and a second image on a second part of the display system for the second area surrounding part,
wherein the first image displayed on the first part of the display system includes content determined to be of interest to the first person, living thing, or object based on a determined profile of the first person, living thing, or object,
wherein the second image displayed on the second part of the display system includes content determined to be of interest to the second person, living thing, or object based on a determined profile of the second person, living thing, or object,
wherein the first image displayed on the first part of the display system is different than the second image displayed on the second part of the display system due to the determined profile of the first person, living thing, or object being different than the determined profile of the second person, living thing, or object.

5. The audio-visual system of claim 1, wherein said directional sound system comprises a piezo, an ultrasonic element, a horn system, and/or one or more amplifiers.

6. The audio-visual system of claim 1, wherein said directional sound system or said sensor system further comprises one or more directional microphones.

7. The audio-visual system of claim 1, wherein said display system comprises a plurality of LED display panels, projection displays, or LCD panels.

8. The audio-visual system of claim 1, wherein each of the LED tiles has a LED processor, being controlled by an image splitter and a graphical card or graphics engine.

9. The audio-visual system of claim 1, further comprising a storage system, comprising a sound storage part and an image storage part, each of the sound storage part and the image storage part having multiple playout capability.

10. The audio-visual system of claim 9, further comprising a selector system for selecting sound and/or one or more images from the storage system.

11. The audio-visual system of claim 1, wherein said sensor system comprises a camera, an IR sensor, and/or an acoustic sensor.

12. The audio-visual system of claim 11, wherein said camera, IR sensor, or acoustic sensor is configured to distinguish said person from another living thing, or from an object.

13. The audio-visual system of claim 11, wherein said camera, IR sensor, or acoustic sensor is configured to distinguish said person from another living thing, or from an object, and in a case a person is recognized, said camera, IR sensor, or acoustic sensor is configured to perform people scanning including face and/or gait recognition.

14. The audio-visual system of claim 13, wherein said camera, IR sensor, or acoustic sensor is configured to perform said people scanning including face and/or gait recognition based on AI techniques wherein the sensor system is equipped or trained with person-recognition methods.

15. A moving staircase, escalator or walkway, for transporting said person, living thing or object, comprising the audio-visual system of claim 1.

16. The audio-visual system of claim 1, wherein the audio-visual system is configured to
emit sound by the directional sound system such that the emitted sound is directed towards said person, living thing or object being recognized as said person, living thing or object moves along said continuous path.

17. The audio-visual system of claim 1, wherein the one or more filters cause the image to be only visible in the area surrounding part of the audio-visual system.

18. The audio-visual system of claim 17, wherein the one or more filters cause the image to be only visible in the area surrounding part of the audio-visual system such that a first image is displayed on said LED that is viewable by a first person, living thing or object only in a first area surrounding part of the audio-visual system and a second image is displayed on said LED that is only viewable by a second person, living thing or object in a second area surrounding part of the audio-visual system, and the first person, living thing or object in the first area is at a distance of 1.5 meters or greater from the second person, living thing or object in the second area.

19. The audio-visual system of claim 1, wherein said audio-visual system is configured to display a video by the display system such that the video displayed is directed towards said person, living thing or object as said person, living thing or object, and the video displayed moves along said continuous path such that the video displayed moves across the plurality of LED tiles together with said person, living thing or object along the audio-visual system along said continuous path continuously and simultaneously at a pace of said person, living thing or object.

20. The audio-visual system of claim 1, wherein the one or more filters adapt the viewing angle by narrowing the viewing angle.

21. The audio-visual system of claim 1, wherein the one or more filters adapt the viewing angle such that the image shown is only viewable to said person just in front of a part of the continuous LED display displaying said image.

22. The audio-visual system of claim 1, wherein in a case that the sensor system recognizes a group including a plurality of persons, living things or objects, in area surrounding part of the audio-visual system, the audio-visual system is configured to determine a difference between one or more characteristics of a first subset of the plurality of persons, living things or objects and one or more corresponding characteristics of a second subset of the plurality of persons, living things or objects.

23. The audio-visual system of claim 22, wherein based on said determined difference, the audio-visual system is configured to generate a sound control signal for emitting the sound and/or generate an image control signal for displaying the image to prioritize entertain for the first subset of the plurality of persons, living things or objects of the group.

24. The audio-visual system of claim 22, wherein based on said determined difference, the audio-visual system is configured to generate a sound control signal for emitting the sound and generate an image control signal for displaying the image to prioritize entertain for the first subset of the plurality of persons, living things or objects of the group.

25. The audio-visual system of claim 1, wherein in a case that the sensor system recognizes a person wearing AR/VR glasses in the surrounding part of the audio-visual system, the audio-visual system is configured to provide content on said LED display and/or the sound system individualized to said person wearing AR/VR glasses.

26. A method for providing audio-visual information along a continuous path, said method comprising the steps of:
providing an audio-visual system comprising a directional sound system, a display system and a sensor system, said display system comprising a continuous LED display comprising a plurality of LED tiles;

receiving data detected by the sensor system for recognizing a person, living thing or object in an area surrounding part of the audio-visual system;

generating a sound control signal for emitting sound by means of the directional sound system, which is connected with the sensor system, towards said person, living thing or object being recognized;

generating an image control signal for displaying an image on part of the display system, which is connected with the sensor system, in the area of said person, living thing or object being recognized; and transmitting said sound and image control signals to said sound and display system respectively;

displaying an image by the display system such that the image displayed is directed towards said person, living thing or object as said person, living thing or object, and the image displayed moves along said continuous path such that the image displayed moves across the plurality of LED tiles together with said person, living thing or object along the audio-visual system along said continuous path continuously and simultaneously at a pace of said person, living thing or object; and providing one or more filters, wherein the one or more filters adapt a viewing angle of the image shown, wherein said one or more filters are configured to adapt the viewing angle based on the amount of persons, living things or objects amongst said plurality thereof being recognized.

27. The method of claim 26, further comprising the step of receiving and interpreting sound emitted and/or gesture made by said person, living thing or object being recognized.

28. The method of claim 27, further comprising the step of interacting with said person, living thing or object being recognized by means of interrogating or responding, meaning directing questions or answers thereto.

29. A hardware storage device having stored thereon computer executable instructions which, when executed by one or more processors of a computer system of an audio-visual system that comprises a directional sound system, a display system, and a sensor system, said display system comprising a continuous LED display comprising a plurality of LED tiles, configure the audio-visual system to perform the following for providing audio-visual information along a continuous path:

receive data detected by the sensor system for recognizing a person, living thing or object in an area surrounding part of the audio-visual system;

generate a sound control signal for emitting sound by means of the directional sound system, connected with the sensor system, towards said person, living thing or object being recognized;

generate an image control signal for displaying an image on part of the display system, connected with the sensor system, in the area of said person, living thing or object being recognized; and transmit said sound and image control signals to said sound and display system respectively;

display an image by the display system such that the image displayed is directed towards said person, living thing or object as said person, living thing or object, and the image displayed moves along said continuous path such that the image displayed moves across the plurality of LED tiles together with said person, living thing or object along the audio-visual system along said continuous path continuously and simultaneously at a pace of said person, living thing or object, and wherein said display system further comprises one or more filters that adapt the viewing angle of the image shown, and wherein said one or more filters are configured to adapt the viewing angle based on the amount of persons, living things or objects amongst said plurality thereof being recognized.

30. A visual system to be provided along a continuous path, the visual system comprising:

a display system, and a sensor system, wherein said display system comprises a continuous LED display comprising a plurality of LED tiles, wherein said visual system is configured to receive data detected by the sensor system for recognizing a person, living thing or object in an area surrounding part of the visual system;

generate an image control signal for displaying an image on part of the display system, which is connected with the sensor system, in the area of said person, living thing or object being recognized; and transmit said image control signal to said display system; and display an image by the display system such that the image displayed is directed towards said person, living thing or object as said person, living thing or object, and the image displayed moves along said continuous path such that the image displayed moves across the plurality of LED tiles together with said person, living thing or object along the visual system along said continuous path continuously and simultaneously at a pace of said person, living thing or object, and wherein said display system further comprises one or more filters for adapting the viewing angle of the image shown, and wherein said one or more filters are configured to adapt the viewing angle based on the amount of persons, living things or objects amongst said plurality thereof being recognized.

* * * * *